No. 614,968. Patented Nov. 29, 1898.
J. MOHS.
VALVE FOR PNEUMATIC TIRES.
(Application filed Jan. 3, 1898.)
(No Model.)
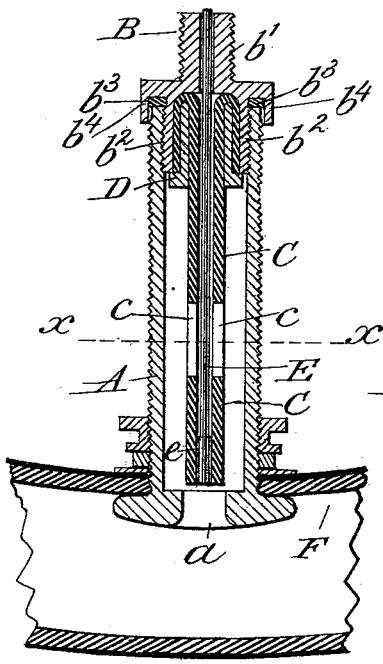
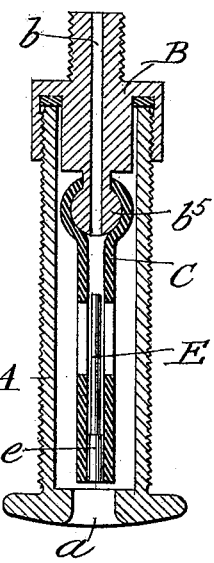
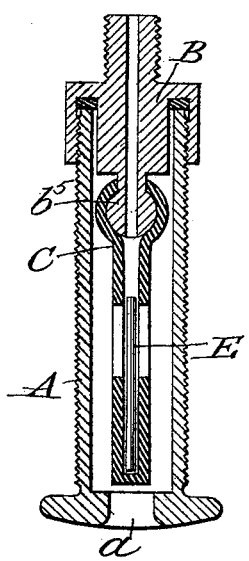
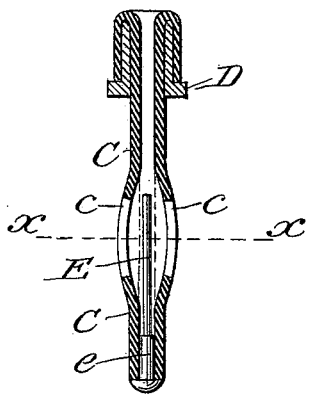
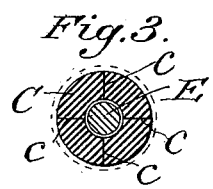
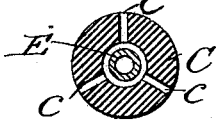
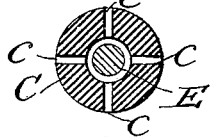
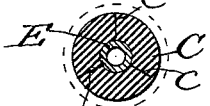
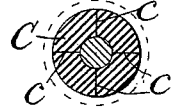
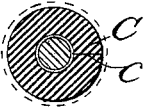
Attest:
F. H. Schott
Mitford C. Massie
Inventor
Julius Mohs
by Max Ferg'n
Attorney

UNITED STATES PATENT OFFICE.

JULIUS MOHS, OF BRANDENBURG-ON-THE-HAVEL, GERMANY.

VALVE FOR PNEUMATIC TIRES.

SPECIFICATION forming part of Letters Patent No. 614,968, dated November 29, 1898.

Application filed January 3, 1898. Serial No. 665,282. (No model.)

*To all whom it may concern:*

Be it known that I, JULIUS MOHS, a citizen of the German Empire, residing at Brandenburg-on-the-Havel, Germany, have invented certain new and useful Improvements in Valves for Pneumatic Tires; and I do hereby declare the following to be a full, clear, and exact description of the invention, such as will enable others skilled in the art to which it appertains to make and use the same.

My invention, generally speaking, relates to valves, and in particular to valves used in connection with pneumatic tires, such as are now generally employed for velocipedes, as well as for other vehicles.

My invention is applied to valves in which a tube of rubber or other elastic material provided with lateral slits for the escape of the compressed air from the force-pump into the tire is employed. It has been found that it is difficult, if not impossible, to procure small tubes for this purpose having walls of uniform thickness. For this and for other reasons it has been ascertained in practice that the parts of the elastic tubes between the slits will not expand uniformly under the pressure of the air from the pump nor contract uniformly when the pressure from the pump ceases and under the pressure from the air in the tire. As a matter of fact the slits are imperfectly closed after the air has been pumped into the tire and a danger of leakage occurs. Moreover, the compressed air in the tires acts to compress the elastic tube merely, so that portions of the same may be pressed flat to such an extent as to cause the inner walls to touch.

The present invention is designed to avoid the objections thus indicated in such a way that a comparatively thin-walled slitted rubber or other elastic tube may be used in such a valve without the danger of collapse and of leakage.

A further subsidiary object is to permit of a very ready discharge of the compressed air from the tire when desired.

With reference to these objects a valve embodying all the features of my invention comprises a rubber or elastic tube extending into an air-cylinder of the valve and secured only to a cap detachably connected to the cylinder, said tube being provided with a slit or slits and containing within it a solid or incompressible rod or stem, preferably of metal or other hard material, said stem fitting loosely within the tube—that is to say, being somewhat less in diameter than the bore of the elastic tube. This stem may be either detached within the elastic tube, which in this case will be closed in any suitable manner at its depending free end, or its lower end be secured in any suitable way to said depending free end of the elastic tube—for example, by an enlargement at its lower end, over which the free end of the elastic tube is drawn, whereby said free end is closed airtight. The solid or incompressible stem may be made to extend upwardly sufficiently to project from the air-duct of the valve, so that by grasping the same with the fingers and drawing it outward the rubber tube may be collapsed and the slot or slots in the same opened to permit the escape of the air from the tire.

My invention also comprises such further features and details of construction as will be hereinafter set forth, and pointed out in the claims.

In the accompanying drawings I have represented what I consider the best forms of carrying my invention into effect.

In the drawings, Figure 1 represents a longitudinal central section of a valve embodying my invention, a portion of the tire to which it is attached being indicated; Fig. 2, a similar view of the elastic tube inflated, together with the stem; Figs. 3, 4, and 5, transverse sections of the tube and stem on the line *x x*, Figs. 1 and 2, showing the tube in the normal, inflated, and compressed condition, respectively; Figs. 6, 7, and 8, similar views, in the same respective order, of a tube provided with three lateral slits instead of four, as in Figs. 3 to 5; Figs. 9 and 10, similar views of a tube in its normal condition and having two slits or one slit, respectively; and Figs. 11 and 12, longitudinal central sections of two somewhat modified forms of carrying out my invention.

By referring first to Figs. 1 to 8 it will be noted that the valve there represented consists of a valve-casing or outer cylinder A, of metal or other hard or rigid material, whose lower end is provided with an air-orifice $a$, which is adapted to be inserted into and fitted to the elastic tire F in any known or suitable manner. At its upper end the cylinder A is provided with a screw-cap B, provided with a duct $b$, through which the cylinder A communicates with the air-pump, and being threaded, as at $b'$, so as to be connected with the said air-pump. The said cap B is adapted to be screwed to the cylinder by the threaded portion $b^2$, engaging a corresponding interior thread in the upper end of said cylinder. An air-tight closure is effected by means of the rubber gasket or washer $b^3$, arranged in the annular space between the threaded portion $b^2$ and a depending flange $b^4$ on the screw-cap. By screwing the cap down tight, so as to compress the gasket $b^3$ between the upper edge of the cylinder B and the cap, the said cylinder is hermetically closed, as will be readily understood.

Depending within the cylinder A is arranged a tube C, of flexible and elastic material, such as rubber, the said tube being provided with lateral slits, which slits are preferably longitudinal and arranged in the same zone or portion of the elastic tube, as shown at $c\ c$, Figs. 1 and 2. This elastic tube may be suspended in various ways within the cylinder, but preferably secured to the screw-cap, as shown, for example, in Figs. 1 and 2—that is to say, the upper end of the elastic tube is drawn through a ferrule D for a short distance and then turned or folded over the outside of the ferrule. The ferrule thus covered with the drawn-down end of the flexible tube is then inserted in the manner of a stopper into the lower bore of the screw-cap B, as shown in Fig. 1. Within the slotted tube is arranged a supporting-stem, which, as I have found, avoids all the objections due to uneven compression of the elastic tube. This stem E, as shown in Fig. 1, consists of a rod of any material, such as metal or wood, and which extends into the elastic tube C to the end of or beyond the slits $c\ c$. It is held in place at its lower end by an enlargement $e$, fitting tightly into the lower end of the elastic tube, so as to hermetically close the same. The rest of the stem E fits loosely within the tube C—i. e., it is slightly less in diameter than the bore of the tube C—so that the air from the pump can pass readily around it.

The operation of a valve thus constructed is as follows: The lower end of the cylinder, with its orifice $a$, being inserted into and fitted to the tire and the upper end $b'$ of the screw-cap B being secured to the pump, as soon as the pump operates the compressed air, taking its way through the duct $b$, passes into the elastic tube C and finding no other exit distends the latter and opens the slits $c\ c$, causing the tube to change from its normal position shown in Figs. 1 and 3 to the position indicated in Figs. 2 and 4. The air escaping through the openings thus formed passes into the annular space of the cylinder surrounding the elastic tube and thence into the tire. As soon as the pump is removed from the valve the high pressure within the tire tends to compress the flexible tube C and forces the portions of the same between the slits $c$ firmly against the stem E, as indicated in Fig. 5. The said stem supporting the tube against any further compression the sections of the same are firmly and evenly compressed around the same and the slits are all tightly closed, all danger of unequally-closed or gaping slits being avoided.

In Figs. 6 to 8 the different positions occupied by the tube are shown for a flexible tube provided with three slits. In Fig. 6 I have shown, moreover, a tubular stem. Such a stem will of course work equally well provided it is made of sufficiently rigid material and one or both of its ends are closed, so as to prevent the exit of air.

In Figs. 9 and 10 the normal condition of a two-slitted tube and a one-slitted tube, respectively, is shown.

Fig. 11 shows a modified form of valve, which differs from the form shown in Figs. 1 and 2 only in the mode of attachment of the rubber or elastic tube C. As shown in this figure, the lower part of the screw-cap B, which extends down into the cylinder, is provided with a spherical enlargement $b^5$, over which the upper end of the elastic tube C is drawn.

In Fig. 12 I have shown another modification of which my invention is susceptible. This form of valve is in all respects substantially the same as that shown in Fig. 1, except that in this case the supporting-stem E is detached and unconnected to the elastic tube, being simply dropped into the latter from the top. Of course in this case the lower end of the tube C is closed in any suitable way.

The supporting-stem is made of such a length as to project from the air-duct $b$ in the screw-cap. This arrangement is indicated in Fig. 1. It will be readily seen that by grasping the end of the stem C and pulling it in the direction of the arrow the elastic tube may be collapsed longitudinally, so as to open the slits $c$, whereby the air from the tire may be exhausted without the necessity of unscrewing the screw-cap B.

Having thus fully set forth my invention and what I consider the best manner of carrying the same into effect, what I claim, and desire to secure by Letters Patent of the United States, is—

1. In a valve of the class described, the combination, with a valve-casing and a cap having an air-duct, and removably attached to the casing, of an elastic tube secured by one end to the cap and depending freely therefrom into the valve-casing, said tube having its free end closed and being provided with a series of slits intermediate its two ends, the interior of the tube being in communication with the air-duct in the cap, and a supporting-stem within the tube.

2. In a valve of the class described, the combination, with a valve-casing and a cap having an air-duct and attached to the casing, of an elastic slitted tube depending into said casing and having its interior in communication with said air-duct, and a supporting-stem within the tube and secured to the lower end of the tube, said stem extending through the air-duct in the cap and above said cap.

In testimony whereof I affix my signature in presence of two witnesses.

JULIUS MOHS.

Witnesses:
 CHARLES H. DAY,
 HENRY HASPER.